US011434653B2

(12) United States Patent
Howells

(10) Patent No.: US 11,434,653 B2
(45) Date of Patent: Sep. 6, 2022

(54) POST JOINT ASSEMBLY AND METHOD FOR COUPLING AN UPPER POST TO A LOWER POST

(71) Applicant: Spinform, Inc., Flint, MI (US)

(72) Inventor: Michael A. Howells, Grand Blanc, MI (US)

(73) Assignee: Spinform, Inc., Flint, MI (US)

( * ) Notice: Subject to any disclaimer, the term of this patent is extended or adjusted under 35 U.S.C. 154(b) by 120 days.

(21) Appl. No.: 16/900,367

(22) Filed: Jun. 12, 2020

(65) Prior Publication Data

US 2021/0388630 A1 Dec. 16, 2021

(51) Int. Cl.
*E04H 12/22* (2006.01)
*F16C 11/06* (2006.01)
*F16C 11/10* (2006.01)

(52) U.S. Cl.
CPC ..... *E04H 12/2284* (2013.01); *E04H 12/2215* (2013.01); *F16C 11/0661* (2013.01); *F16C 11/106* (2013.01)

(58) Field of Classification Search
CPC ............. E04H 12/2284; E04H 12/2215; F16C 11/0661; F16C 11/106; Y10T 403/32196; Y10T 403/32204; Y10T 403/32631
USPC ........ 248/507, 516, 521, 523, 526, 527, 900
See application file for complete search history.

(56) References Cited

U.S. PATENT DOCUMENTS

| 4,157,876 A | 6/1979 | DiGiulio |
| 4,199,908 A * | 4/1980 | Teeters ................ E04H 12/2284 248/357 |
| 5,307,598 A * | 5/1994 | West .................. A47G 29/1216 232/39 |
| 5,404,682 A * | 4/1995 | West .................. A47G 29/1216 248/183.1 |
| 5,458,428 A * | 10/1995 | West .................. A47G 29/1216 403/252 |
| 6,273,390 B1 | 8/2001 | Meyer |
| 9,004,439 B2 * | 4/2015 | Gross .................. E04H 12/2261 248/507 |
| 9,394,717 B2 * | 7/2016 | Paananen ............ E04H 12/2284 |
| 2005/0204654 A1 | 9/2005 | Fredrickson |
| 2005/0218273 A1 * | 10/2005 | Huang ................ F16C 11/0661 248/126 |
| 2018/0251996 A1 * | 9/2018 | Roy ........................ E02D 27/42 |

FOREIGN PATENT DOCUMENTS

DE 407121 C * 12/1924 ................ B61F 5/16

* cited by examiner

*Primary Examiner* — Kimberly T Wood
(74) *Attorney, Agent, or Firm* — Buckert Patent & Trademark Law Firm PC; John F. Buckert

(57) ABSTRACT

A post joint assembly and a method are provided. The assembly includes an upper cup member having a flat top wall, a tubular wall, a flange portion, and a threaded stud. The assembly further includes a lower cup member having a parabolic dish portion, a tubular portion, and a beaded edge portion. An outer surface of the parabolic dish portion is disposed against an inner surface of the flange portion of the upper cup member such that the threaded stud extends through a first hole in the lower cup member. The assembly further includes a tensioner cup having a second hole with the threaded stud extending therethrough. The assembly further includes a nut threadably coupled to the threaded stud such that the nut urges the tensioner cup against the lower cup member, and further urges the lower cup member against the upper cup member.

19 Claims, 13 Drawing Sheets

USER PROVIDES AN UPPER CUP MEMBER HAVING A FLAT TOP WALL, A TUBULAR WALL, A FLANGE PORTION, AND A THREADED STUD; THE TUBULAR WALL BEING COUPLED TO AND BETWEEN THE FLAT TOP WALL AND THE FLANGE PORTION AND EXTENDING FROM THE FLAT TOP WALL IN A FIRST DIRECTION, THE FLANGE PORTION EXTENDING OUTWARDLY FROM THE TUBULAR WALL, THE THREADED STUD BEING COUPLED TO THE FLAT TOP WALL AND EXTENDING IN THE FIRST DIRECTION — 600

USER PROVIDES A LOWER CUP MEMBER HAVING A PARABOLIC DISH PORTION, A TUBULAR PORTION, AND A BEADED EDGE PORTION; THE PARABOLIC DISH PORTION HAVING A FIRST HOLE EXTENDING THERETHROUGH, THE TUBULAR PORTION BEING COUPLED TO AND BETWEEN THE PARABOLIC DISH PORTION AND THE BEADED EDGE PORTION — 602

USER PROVIDES A TENSIONER CUP HAVING A SECOND HOLE EXTENDING THERETHROUGH — 604

USER PROVIDES A NUT, A LOCKING WASHER, AND A STUD WASHER — 606

USER COUPLES THE FLAT TOP WALL OF THE UPPER CUP MEMBER TO THE UPPER POST UTILIZING FIRST, SECOND, THIRD AND FOURTH SCREWS THAT EXTEND THROUGH FIRST, SECOND, THIRD, AND FOURTH WASHERS, RESPECTIVELY, AND FIRST, SECOND, THIRD AND FOURTH APERTURES, RESPECTIVELY, IN THE FLAT TOP WALL AND INTO THE UPPER POST — 608

FIG. 16

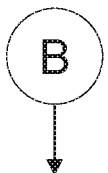

USER COUPLES THE LOWER CUP MEMBER TO THE LOWER POST UTILIZING FIFTH, SIXTH, SEVENTH, AND EIGHTH SCREWS THAT EXTEND THROUGH FIFTH, SIXTH, SEVENTH, AND EIGHTH WASHERS, RESPECTIVELY, AND FURTHER THROUGH FIFTH, SIXTH, SEVENTH, AND EIGHTH APERTURES, RESPECTIVELY, EXTENDING THROUGH THE FLANGE PORTION OF THE UPPER CUP MEMBER, AND FURTHER THROUGH NINTH, TENTH, ELEVENTH, AND TWELFTH APERTURES, RESPECTIVELY, IN THE PARABOLIC DISH PORTION OF THE LOWER CUP MEMBER, AND INTO THE LOWER POST — 620

USER COUPLES THE LOWER CUP MEMBER TO THE LOWER POST UTILIZING NINTH, TENTH, ELEVENTH, AND TWELFTH SCREWS THAT EXTEND THROUGH NINTH, TENTH, ELEVENTH, AND TWELFTH WASHERS, RESPECTIVELY, AND FURTHER THROUGH THIRTEENTH, FOURTEENTH, FIFTEENTH, AND SIXTEENTH APERTURES, RESPECTIVELY, IN THE TUBULAR PORTION OF THE LOWER CUP MEMBER, AND INTO THE LOWER POST — 622

FIG. 18

POST JOINT ASSEMBLY AND METHOD FOR COUPLING AN UPPER POST TO A LOWER POST

BACKGROUND

The inventor herein has recognized a need for an improved post joint assembly for coupling an upper post to a lower post that allows a user to position the upper post at a longitudinal axis different than a longitudinal axis of the lower post that is secured in the ground. In particular, if the lower post that is secured in the ground is leaning and is not perpendicular to a top surface of the ground, the post joint assembly described herein allows a user to adjust the position of the upper post angularly or rotationally relative to the lower post to a desired position (e.g., perpendicular to the top surface of the ground) prior to securing the upper post at a fixed position relative to the lower post.

SUMMARY

A post joint assembly in accordance with an exemplary embodiment is provided. The post joint assembly includes an upper cup member having a flat top wall, a tubular wall, a flange portion, and a threaded stud. The tubular wall is coupled to and between the flat top wall and the flange portion and extends from the flat top wall in a first direction. The flange portion extends outwardly from the tubular wall. The threaded stud is coupled to the flat top wall and extends in the first direction. The post joint assembly further includes a lower cup member having a parabolic dish portion, a tubular portion, and a beaded edge portion. The parabolic dish portion has a first hole extending therethrough. The tubular portion is coupled to and between the parabolic dish portion and the beaded edge portion. An outer surface of the parabolic dish portion is disposed against an inner surface of the flange portion of the upper cup member such that the threaded stud extends through the first hole. The post joint assembly further includes a tensioner cup having a second hole extending therethrough. The threaded stud extends through the second hole. The post joint assembly further includes a nut threadably coupled to the threaded stud such that the nut urges the tensioner cup against the lower cup member, and further urges the lower cup member against the upper cup member.

A method for coupling an upper post to a lower post in accordance with another exemplary embodiment is provided. The method includes providing an upper cup member having a flat top wall, a tubular wall, a flange portion, and a threaded stud. The tubular wall is coupled to and between the flat top wall and the flange portion and extends from the flat top wall in a first direction. The flange portion extends outwardly from the tubular wall. The threaded stud is coupled to the flat top wall and extends in the first direction. The method further includes providing a lower cup member having a parabolic dish portion, a tubular portion, and a beaded edge portion. The parabolic dish portion has a first hole extending therethrough. The tubular portion is coupled to and between the parabolic dish portion and the beaded edge portion. The method further includes providing a tensioner cup having a second hole extending therethrough. The method further includes providing a nut. The method further includes coupling the flat top wall of the upper cup member to the upper post utilizing first and second screws that extend through the flat top wall and into the upper post. The method further includes disposing an outer surface of the parabolic dish portion against an inner surface of the flange portion of the upper cup member such that the threaded stud extends through the first hole. The method further includes disposing the tensioner cup against an inner surface of the parabolic dish portion of the lower cup member such that the threaded stud extends through the second hole of the tensioner cup. The method further includes threadably disposing a nut on the threaded stud such that the nut urges the tensioner cup to contact the lower cup member, and further urges the lower cup member to contact the upper cup member. The method further includes coupling the lower cup member to the lower post utilizing third and fourth screws that extend through the lower cup member and into the lower post.

BRIEF DESCRIPTION OF THE DRAWINGS

FIGS. 16-18 are a flowchart of a method for coupling an upper post to a lower post in accordance with another exemplary embodiment.

DETAILED DESCRIPTION

Figure 1:
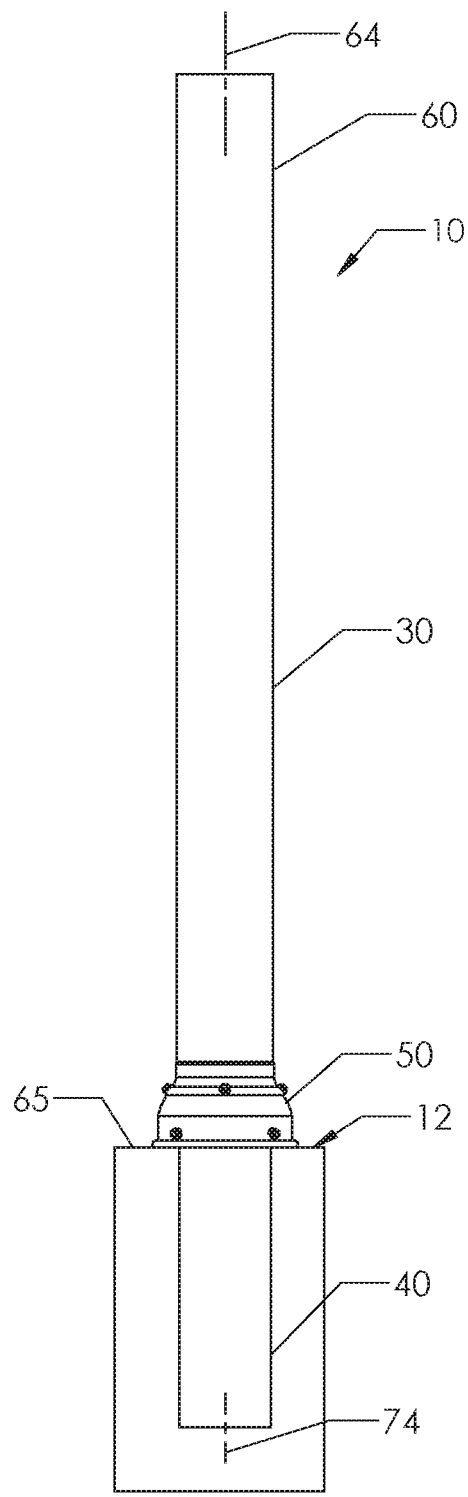
FIG. 1 is a schematic of a post assembly coupled to the ground wherein the post assembly utilizes a post joint assembly in accordance with an exemplary embodiment to couple together a lower post and an upper post.
Figure 2:
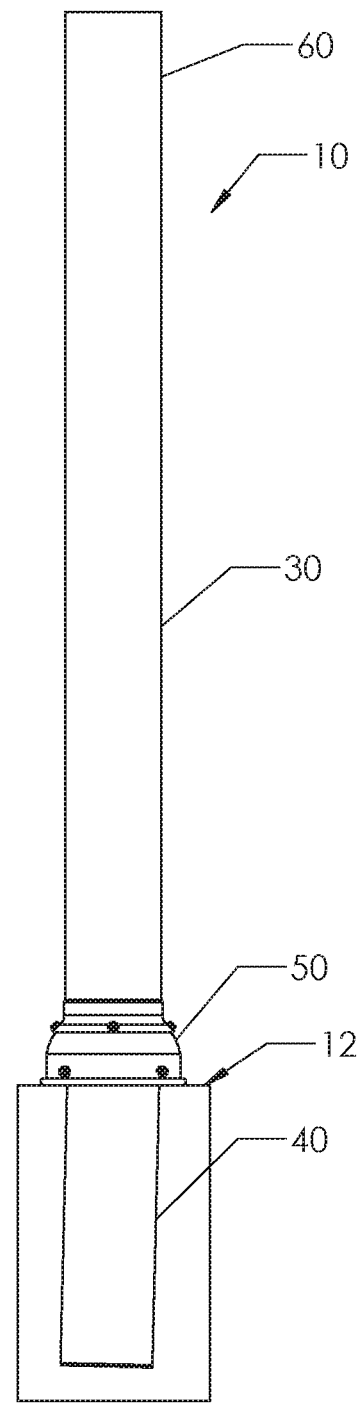
FIG. 2 is another schematic of the post assembly of FIG. 1.

Referring to FIGS. 1 and 2, a post assembly 10 that is coupled to the ground 12 is illustrated. The post assembly 10 includes an upper post 30, a lower post 40, and a post joint assembly 50 in accordance with an exemplary embodiment.

Referring to FIGS. 1-4, an advantage of the post joint assembly 50 is that the assembly 50 utilizes an lower cup member 82 that can be easily positioned rotationally or angularly relative to a upper cup member 80 before securing the lower cup member 82 at a fixed position relative to the upper cup member 80. As a result, the upper cup member 80 can be coupled to the upper post 40, and the lower cup member 82 can be coupled to the lower post 40 such that a longitudinal axis 64 of the upper post 30 is different than the longitudinal axis 74 of the lower post 40. The structure and functionality of the post joint assembly 50 is especially beneficial when the lower post 40 is leaning and has a longitudinal axis 74 that is not perpendicular with a top surface 65 of the ground 12, and a user desires that the upper post 40 have a longitudinal axis 64 that is perpendicular with the top surface 65 of the ground 12. For example, if the lower post 40 that is secured in the ground 12 is leaning such that the longitudinal axis 74 is not perpendicular to a top surface 65 of the ground 12, the post joint assembly 50 allows a user to adjust the position of the upper post 30 angularly or rotationally relative to the lower post 40 to a desired position (e.g., the longitudinal axis 64 is perpendicular to the top surface 65 of the ground 12) prior to securing the upper post 30 at a fixed position relative to the lower post 40.

The upper post 30 includes a first end portion 60 and a second portion 62. Further, the upper post 30 extends along a longitudinal axis 64. In an exemplary embodiment, the longitudinal axis 64 is perpendicular to a top surface 65 of the ground 12. Further, in exemplary embodiment, the upper post 30 comprises a 4"×4" wooden post. Of course, in alternative embodiments, the upper post 30 could comprise other types of posts known to those skilled in the art. The second end portion 62 is coupled to an upper cup member 80 of the post joint assembly 50 utilizing screws 100, 102, 104, 106 which will be explained in greater detail below.

The lower post 40 includes a first end portion 70 and a second portion 72. Further, the lower post 40 extends along a longitudinal axis 74. In an exemplary embodiment, the longitudinal axis 74 is not perpendicular to the top surface 65 of the ground 12. Further, in exemplary embodiment, the lower post 40 comprises a 4"×4" wooden post. Of course, in alternative embodiments, the lower post 40 could comprise other types of posts known to those skilled in the art. The second end portion 72 is coupled to a lower cup member 82 of the post joint assembly 50 utilizing screws 110, 112, 114, 116, 120, 122, 124, 126 which will be explained in greater detail below.

Referring to FIGS. 1-4, the post joint assembly 50 is coupled to and between the upper post 30 and the lower post 40. The post joint assembly 50 includes an upper cup member 80, a lower cup member 82, a tensioner cup 84, a stud washer 86, a locking washer 88, a nut 90, screws 100, 102, 104, 106, 110, 112, 114, 116, 120, 122, 124, 126, and washers 150, 152, 154, 156, 160, 162, 164, 166, 170, 172, 174, 176.

Figure 5:
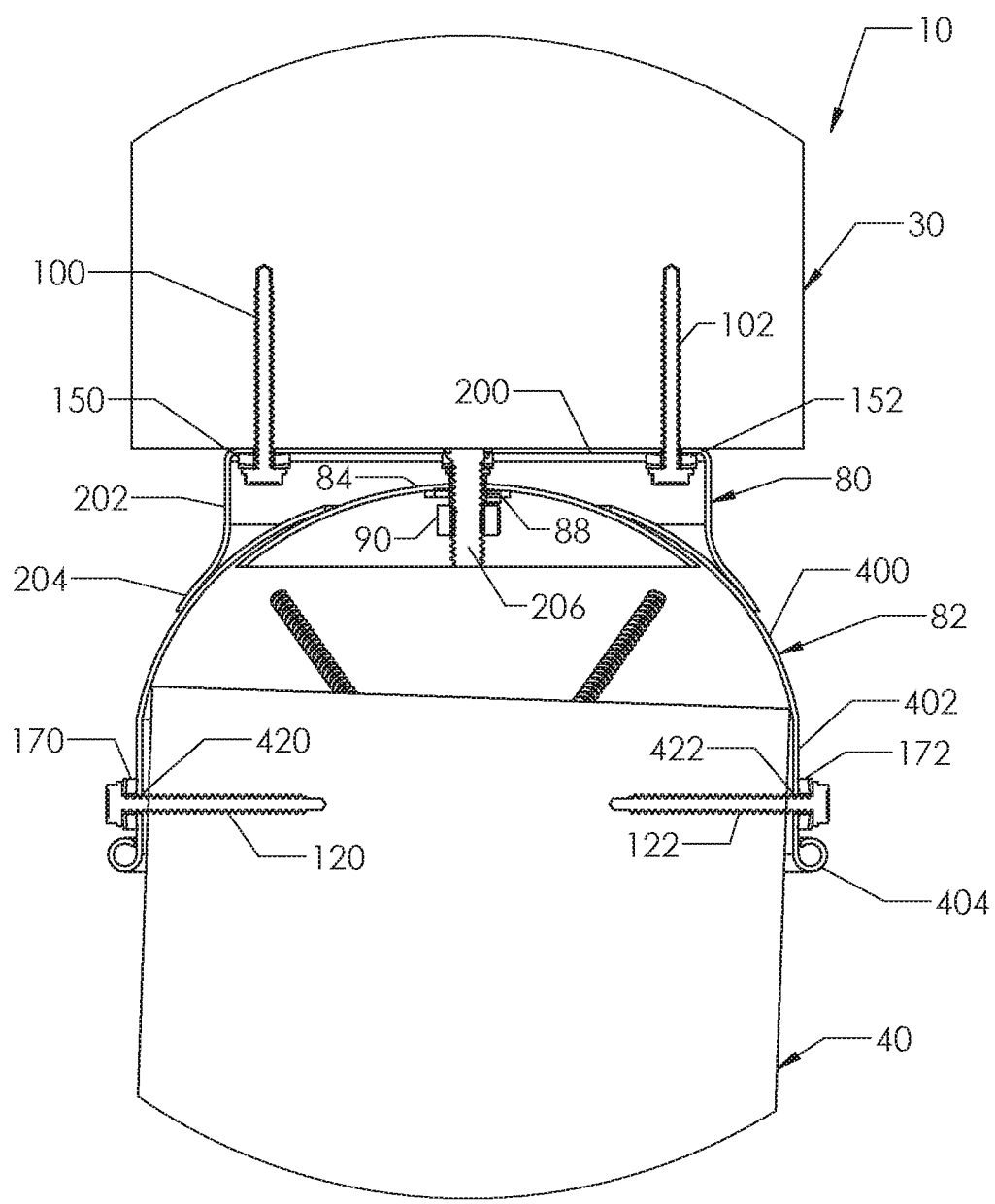
FIG. 5 is a cross-sectional view of a portion of the post assembly of FIG. 1.
Figure 6:
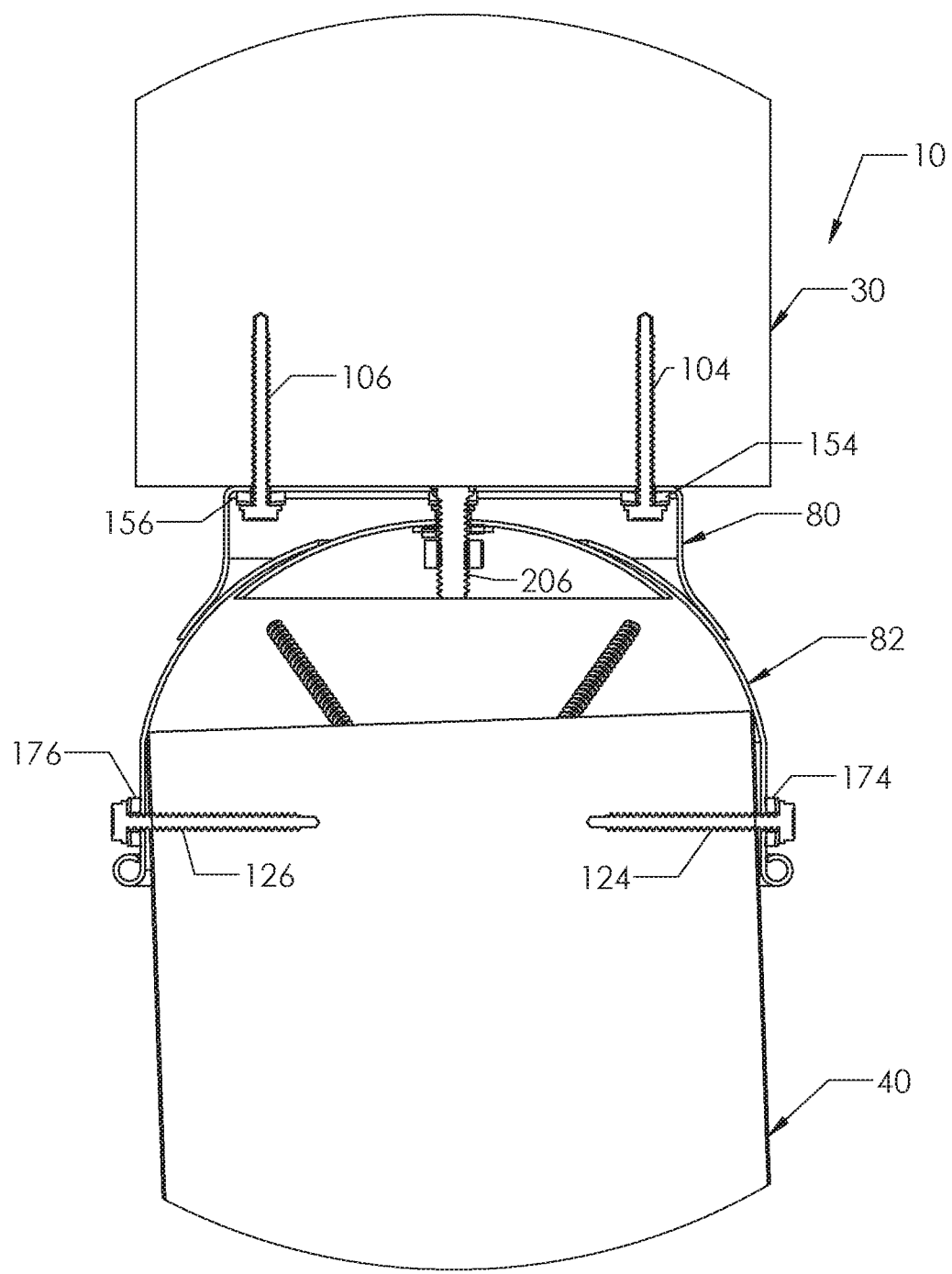
FIG. 6 is another cross-sectional view of a portion of the post assembly of FIG. 1.
Figure 7:
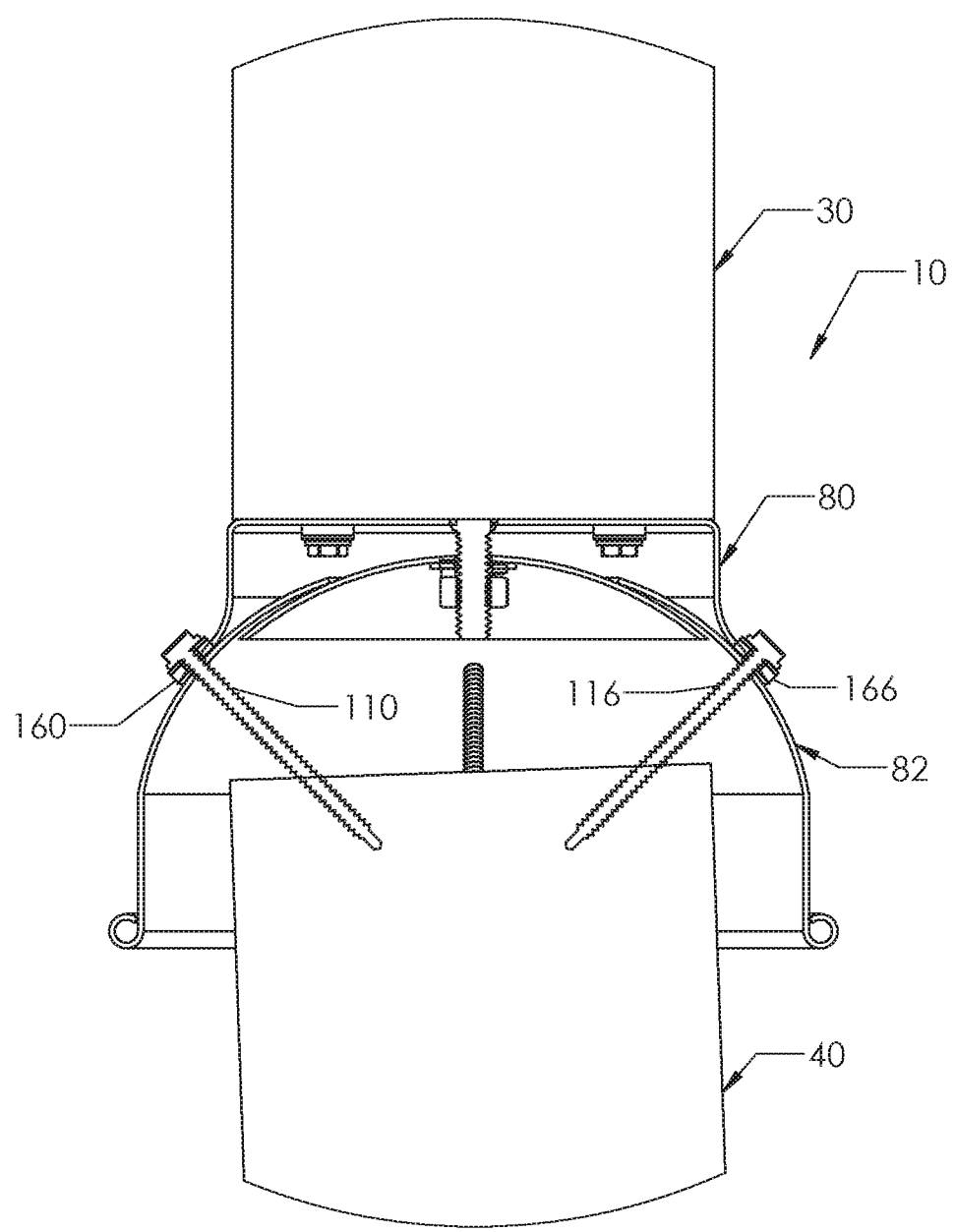
FIG. 7 is another cross-sectional view of a portion of the post assembly of FIG. 1.
Figure 8:
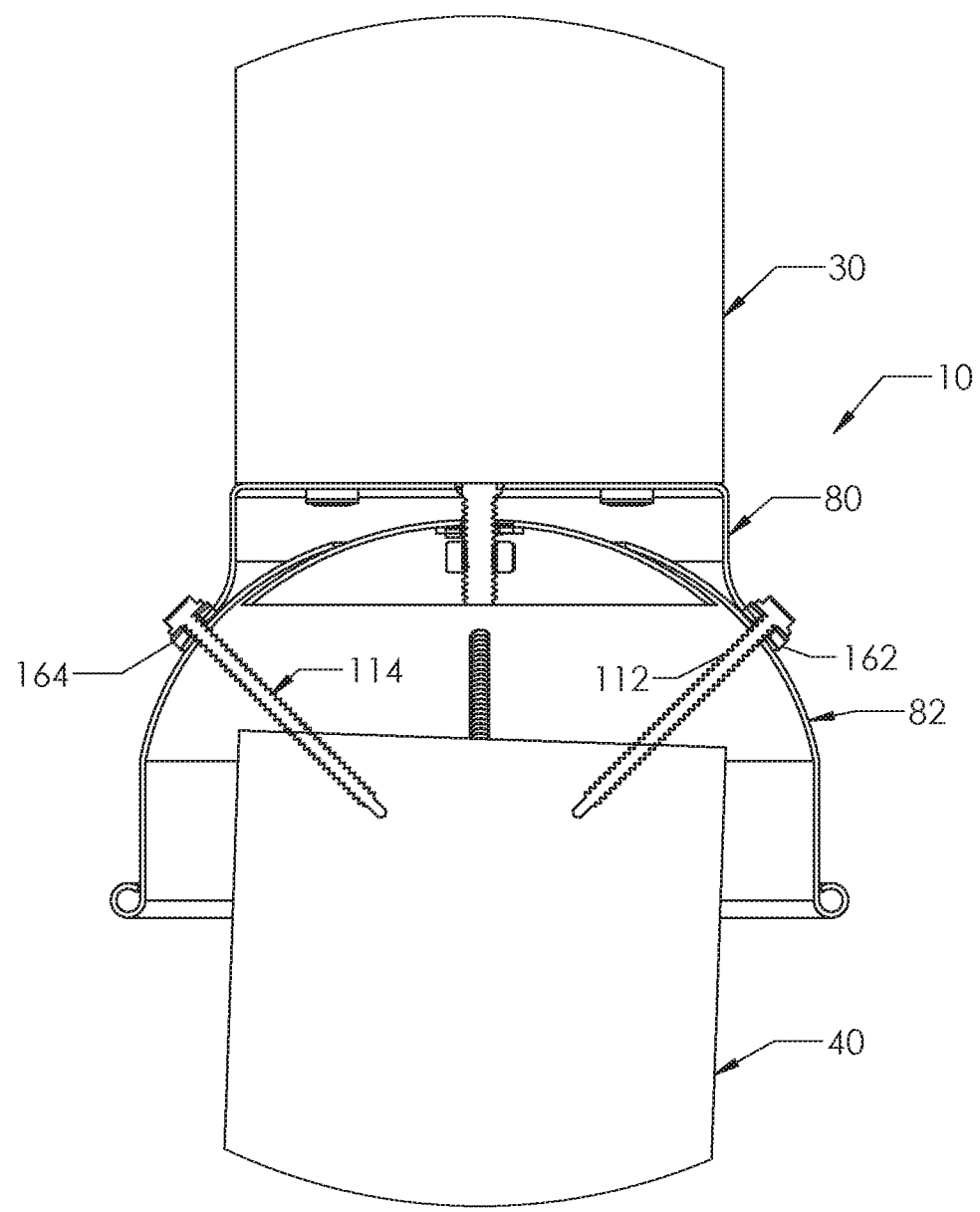
FIG. 8 is another cross-sectional view of a portion of the post assembly of FIG. 1.
Figure 9:
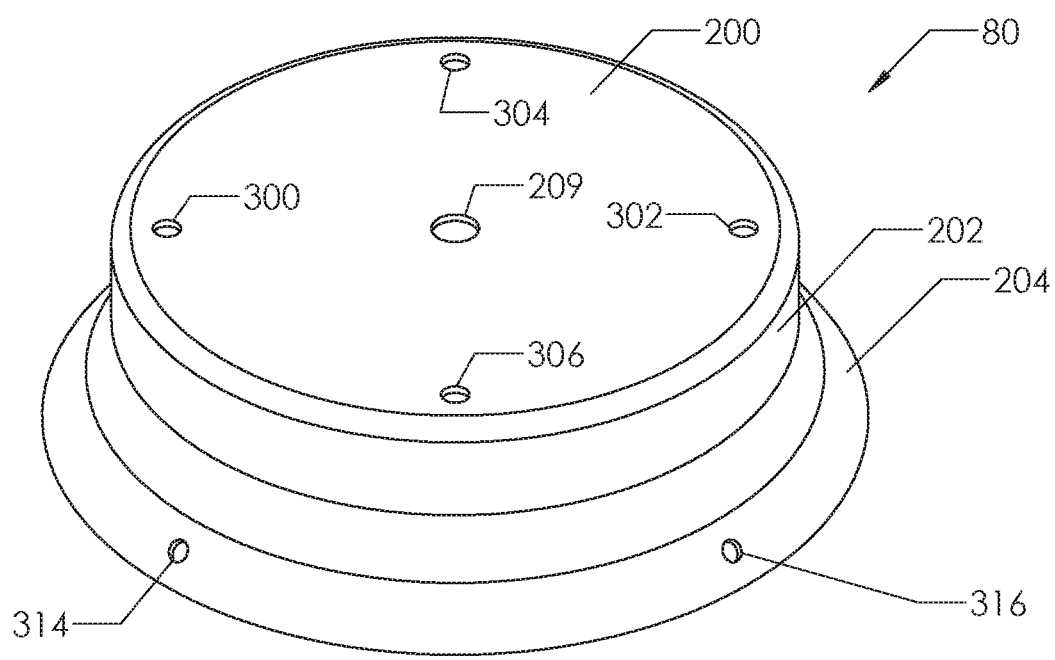
FIG. 9 is a schematic of an upper cup member utilized in the post joint assembly of FIG. 1.
Figure 10:
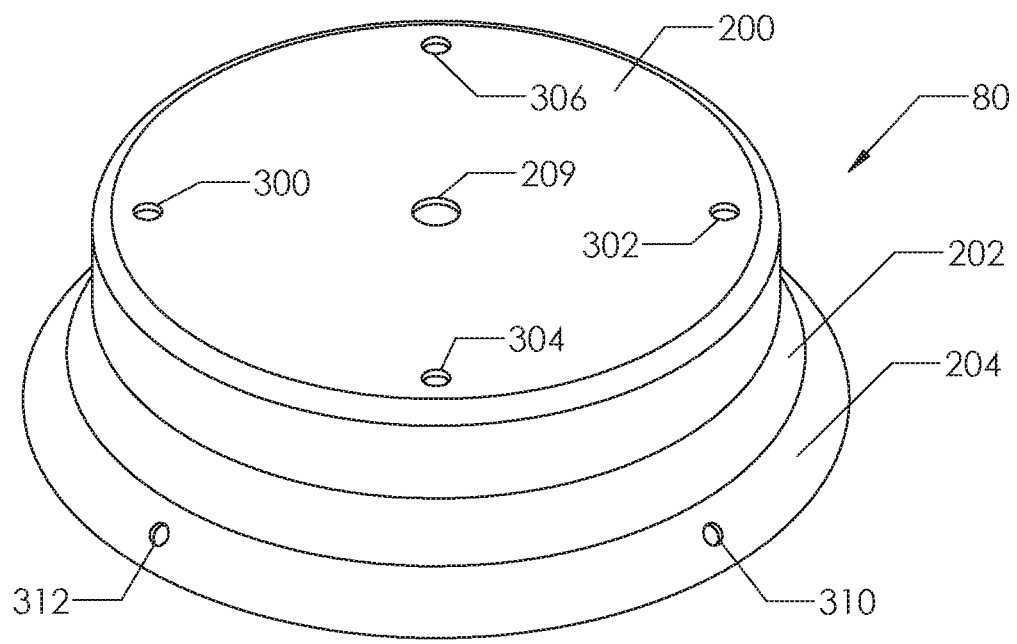
FIG. 10 is another schematic of the upper cup member of FIG. 9.
Figure 11:
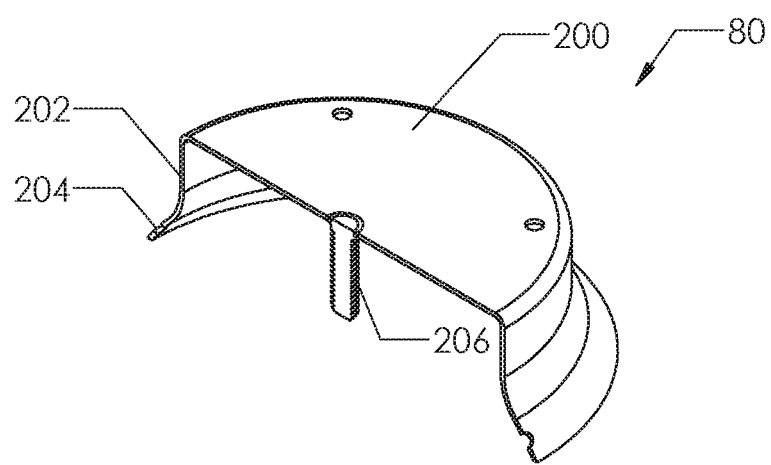
FIG. 11 is a cross-sectional schematic of the upper cup member of FIG. 9.
Figure 12:
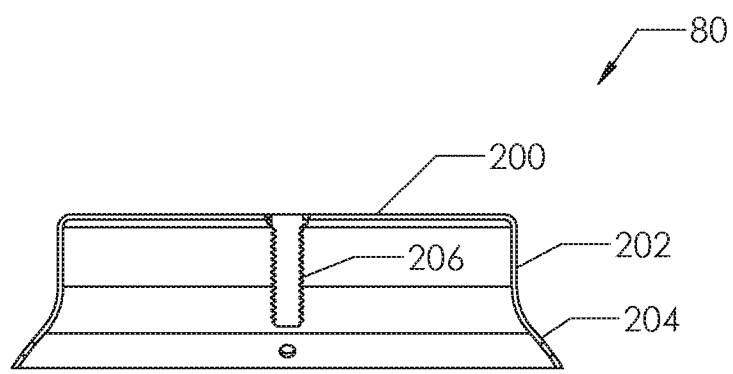
FIG. 12 is another cross-sectional schematic of the upper cup member of FIG. 9.

Referring to FIGS. 3-12, the upper cup member 80 is coupled to the second end 62 of the upper post 30 utilizing screws 100, 102, 104, 106. Referring to FIG. 5, the upper cup member 80 includes a flat top wall 200, a tubular wall 202, a flange portion 204, and a threaded stud 206. The tubular wall 202 is coupled to and between the flat top wall 200 and the flange portion 204 and extends from the flat top wall 200 in a first direction (e.g., downwardly in FIG. 5). The flange portion 204 is coupled to the tubular wall 202 and extends outwardly from the tubular wall 202. The threaded stud 206 is coupled to the flat top wall 200 and extends in the first direction. In an exemplary embodiment, the upper cup member 80 is constructed of a metal or a metal-alloy. Further, the flat top wall 200, the tubular wall 202, the flange portion 204 are integrally formed together.

Referring to FIGS. 3, 4, 9 and 10, the screws 100, 102, 104, 106 extend through the washers 150, 152, 154, 156, respectively and further through the apertures 300, 302, 304, 306, respectively, in the flat top wall 200 of the upper cup member 80 and into the second end portion 62 of the upper post 30—to couple the upper cup member 80 to the upper post 30.

Further, referring to FIGS. 3, 4, 7-10, 13 and 14, the screws 110, 112, 114, 116 extend through the washers 160, 162, 164, 166, respectively and further through apertures 310, 312, 314, 316, respectively, in the flange portion 204 of the upper cup member 80, and further through apertures 410, 412, 414, 416, respectively, in the parabolic dish portion 400 of the lower cup member 82, and further into the lower post 40—to couple the upper cup member 80 and the lower cup member 82 to the lower post 40.

Figure 13:
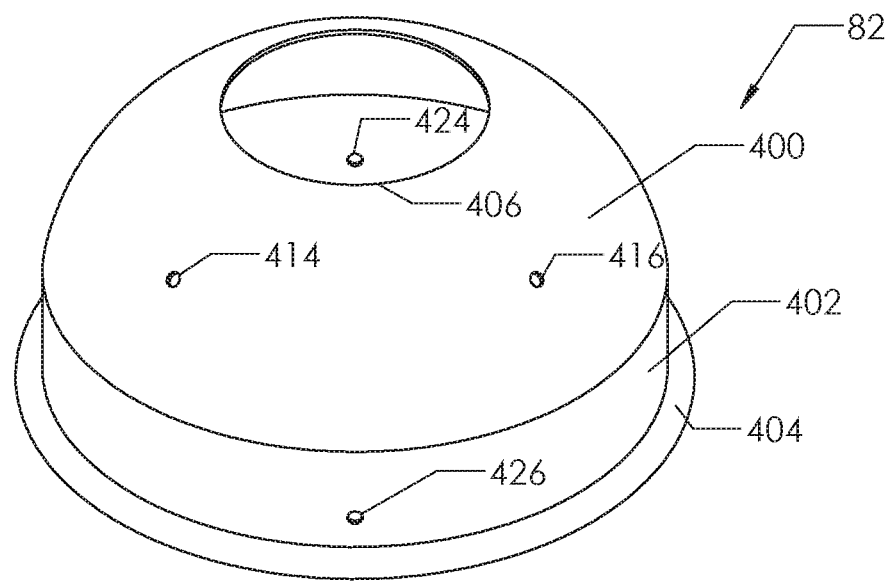
FIG. 13 is a schematic of a lower cup member utilized in the post joint assembly of FIG. 1.
Figure 14:
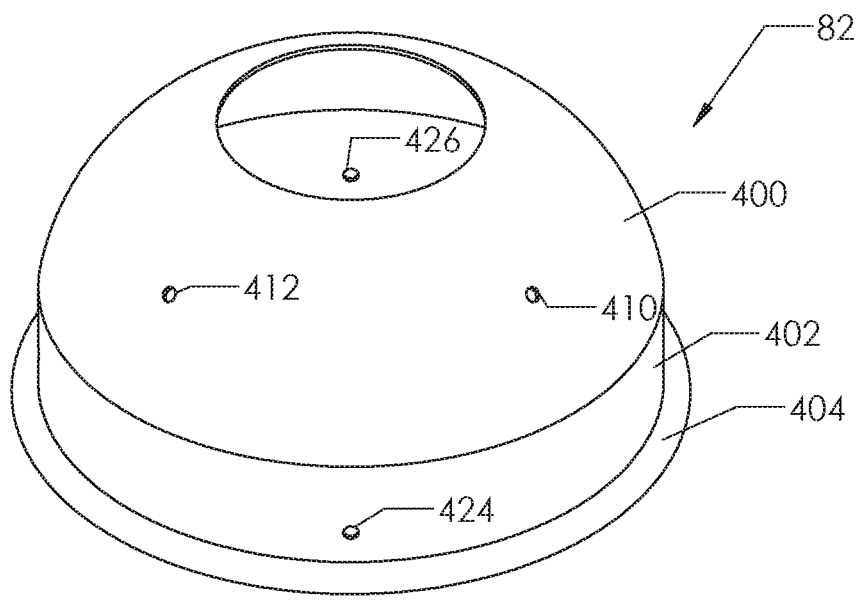
FIG. 14 is another schematic of the lower cup member of FIG. 13.

Referring to FIGS. 5, 6, 13, and 14, the lower cup member 82 has a parabolic dish portion 400, a tubular portion 402, and a beaded edge portion 404. The parabolic dish portion 400 has a first hole 406 extending therethrough. The tubular portion 402 is coupled to and between the parabolic dish portion 400 and the beaded edge portion 404. Referring to FIGS. 5 and 13, an outer surface of the parabolic dish portion 400 is disposed against an inner surface of the flange portion 204 of the upper cup member 80 such that the threaded stud 206 extends through the first hole 406. In an exemplary embodiment, the lower cup member 82 is constructed of a metal or a metal alloy. Further, the parabolic dish portion 400, the tubular portion 402, and the beaded edge portion 404 are integrally formed together.

As discussed above, referring to FIGS. 3, 4, 7-10, 13 and 14, the screws 110, 112, 114, 116 extend through apertures 310, 312, 314, 316, respectively, in the flange portion 204 of the upper cup member 80, and further through apertures 410, 412, 414, 416, respectively, in the parabolic dish portion 400 of the lower cup member 82, and further into the lower post 40—to couple the upper cup member 80 and the lower cup member 82 to the lower post 40.

Referring to FIGS. 3-6, 13 and 14, the screws 120, 122, 124, 126 extend through the washers 170, 172, 174, 176, respectively, and further through the apertures 420, 422, 424, 426, respectively, in the tubular portion 402 of the lower cup member 82, and further into the lower post 40—to couple the lower cup member 82 to the lower post 40.

Figures 3, 4:
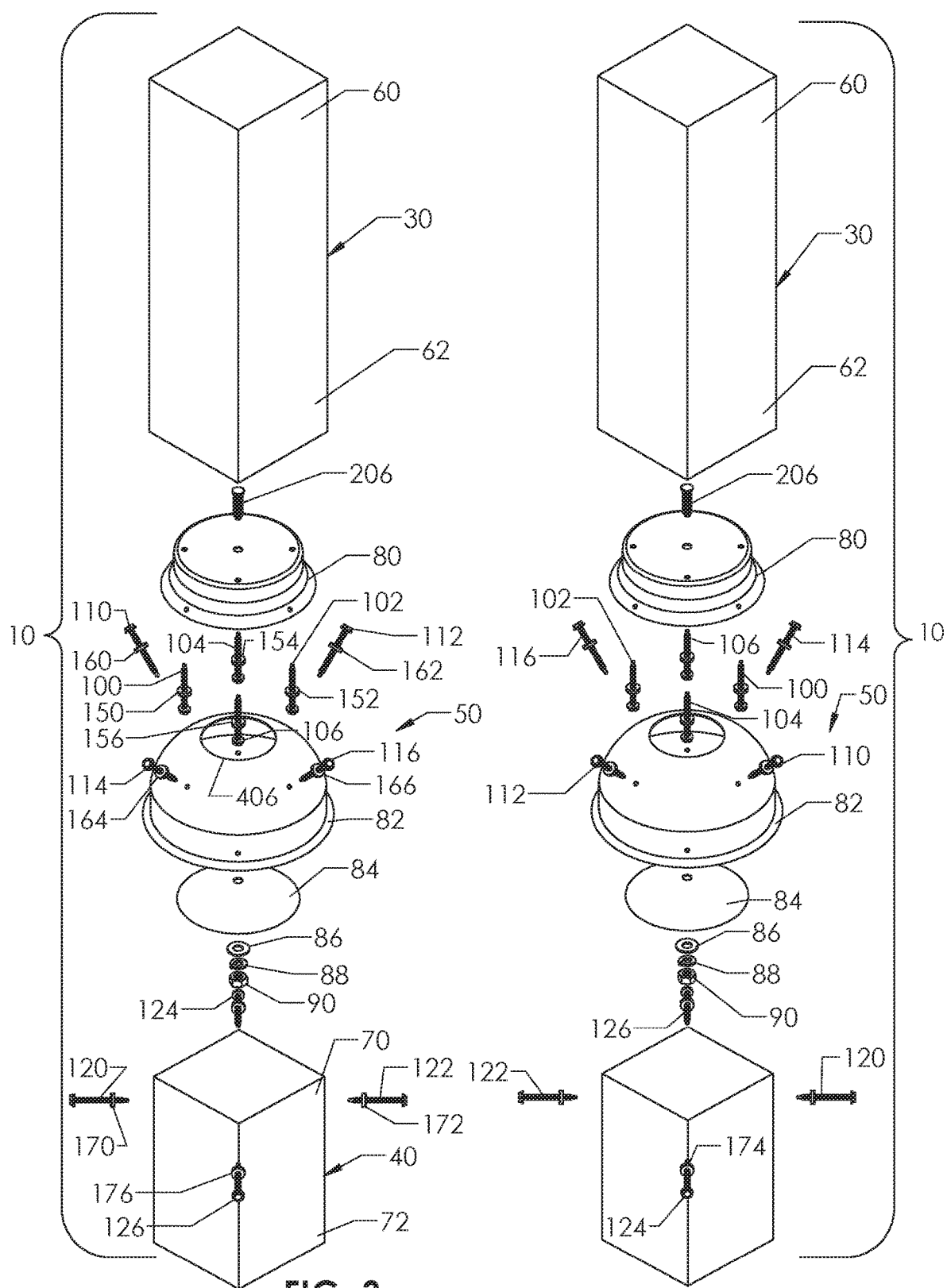
FIG. 3 is an exploded view of the post assembly of FIG. 1.
FIG. 4 is another exploded view of the post assembly of FIG. 1.
Figure 15:
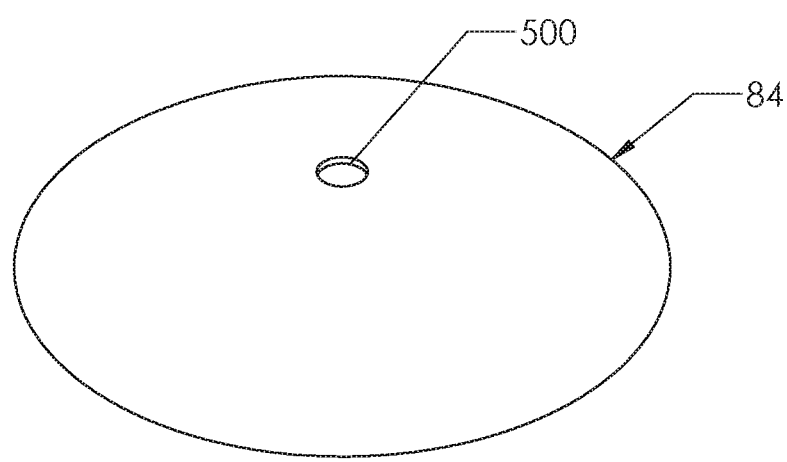
FIG. 15 is a schematic of a tensioner cup utilized in the post joint assembly of FIG. 1.
Figure 17:
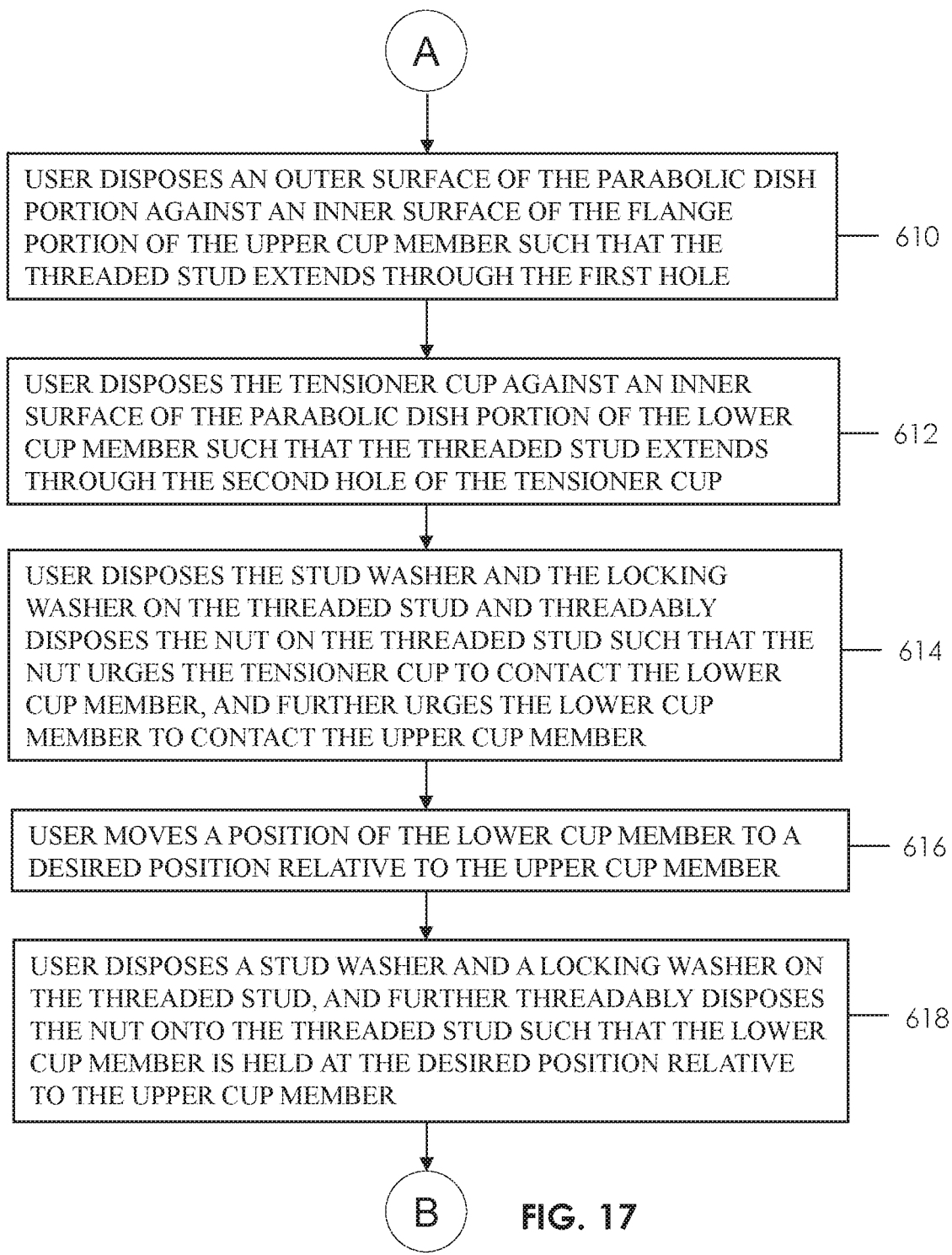

Referring to FIGS. 3, 5, and 15, the tensioner cup 84 is utilized to urge the lower cup member 82 against the upper cup member 80 at a desired position before coupling the lower cup member 82 to the lower post 40. The tensioner cup 84 has a second hole 500 extending therethrough. The threaded stud 206 extends through the second hole 500. The stud washer 86 and the locking washer 88 are disposed on the threaded stud 206, and then the nut 90 is threadably coupled to the threaded stud 206. The nut 90 urges the tensioner cup 84 against the lower cup member 82, and further urges the lower cup member 82 against the upper cup member 80.

Referring to FIGS. 1, 3, 4, and 16-18, a flowchart of a method for coupling the upper post 30 to the lower post 40 utilizing the post joint assembly 50 in accordance with another exemplary embodiment will be explained.

At step 600, a user provides an upper cup member 80 having a flat top wall 200, a tubular wall 202, a flange portion 204, and a threaded stud 206 The tubular wall 202 is coupled to and between the flat top wall 200 and the flange portion 204 and extends from the flat top wall 200 in a first direction. The flange portion 204 extends outwardly from the tubular wall 202. The threaded stud 206 is coupled to the flat top wall 200 and extends in the first direction. After step 600, the method advances to step 602.

At step 602, the user provides a lower cup member 82 having a parabolic dish portion 400, a tubular portion 402, and a beaded edge portion 404. The parabolic dish portion 400 has a first hole 406 extending therethrough. The tubular portion 402 is coupled to and between the parabolic dish portion 400 and the beaded edge portion 404. After step 602, the method advances to step 604.

At step 604, the user provides a tensioner cup 84 having a second hole 500 extending therethrough. After step 604, the method advances to step 606.

At step 606, the user provides a nut 90, a locking washer 88, and a stud washer 86. After step 606, the method advances to step 608.

At step 608, the user couples the flat top wall 200 of the upper cup member 80 to the upper post utilizing first, second, third and fourth screws 100, 102, 104, 106 that extend through first, second, third, and fourth washers 150, 152, 154, 156, respectively, and first, second, third and fourth apertures 300, 302, 304, 306, respectively, in the flat top wall 200 and into the upper post 30. After step 608, the method advances to step 610.

At step 610, the user disposes an outer surface of the parabolic dish portion 400 against an inner surface of the flange portion 204 of the upper cup member 80 such that the threaded stud 206 extends through the first hole 406. After step 610, the method advances to step 612.

At step 612, the user disposes the tensioner cup 84 against an inner surface of the parabolic dish portion 400 of the lower cup member 82 such that the threaded stud 206 extends through the second hole 500 of the tensioner cup 84. After step 612, the method advances to step 614.

At step 614, the user disposes the stud washer 86 and the locking washer 88 on the threaded stud 206 and threadably disposes the nut 90 on the threaded stud 206 such that the nut 90 urges the tensioner cup 84 to contact the lower cup member 82, and further urges the lower cup member 82 to contact the upper cup member 80. After step 614, the method advances to step 616.

At step 616, the user moves a position of the lower cup member 82 to a desired position relative to the upper cup member 80. After step 616, the method advances to step 618.

At step 618, the user disposes a stud washer and a locking washer on the threaded stud, and further threadably disposes the nut 90 onto the threaded stud 206 such that the lower cup member 82 is held at the desired position relative to the upper cup member 80. After step 618, the method advances to step 620.

At step 620, the user couples the lower cup member 82 to the lower post 40 utilizing fifth, sixth, seventh, and eighth screws 110, 112, 114, 160 that extend through fifth, sixth, seventh, and eighth washers 160, 162, 164, 166, respectively, and further through fifth, sixth, seventh, and eighth apertures 310, 312, 314, 316, respectively, extending through the flange portion 204 of the upper cup member 80, and further through ninth, tenth, eleventh, and twelfth apertures 410, 412, 414, 460, respectively, in the parabolic dish portion 400 of the lower cup member 82, and into the lower post 40. After step 620, the method advances to step 622.

At step 622, the user couples the lower cup member 82 to the lower post 40 utilizing ninth, tenth, eleventh, and twelfth screws 120, 122, 124, 126 that extend through ninth, tenth, eleventh, and twelfth washers 170, 172, 170, 176, respectively, and further through thirteenth, fourteenth, fifteenth, and sixteenth apertures 20, 422, 424, 426, respectively, in the tubular portion 402 of the lower cup member 82, and into the lower post 40.

The post joint assembly 50 and the method of coupling the upper post 30 to the lower post 40 utilizing the post joint assembly 50 provide a substantial advantage over other assemblies and methods. In particular, the post joint assembly 50 utilizes a lower cup member 82 that can be easily positioned rotationally or angularly relative to a upper cup member 80 before securing the lower cup member 82 at a fixed position relative to the upper cup member 80. As a result, the upper cup member 80 can be coupled to the upper post 40, and the lower cup member 82 can be coupled to the lower post 40 such that a longitudinal axis 64 of the upper post 30 is different than the longitudinal axis 74 of the lower post 40. The structure and functionality of the post joint assembly 50 is especially beneficial when the lower post 40 is leaning and has a longitudinal axis 74 that is not perpendicular with a top surface 65 of the ground 12, and a user desires that the upper post 40 have a longitudinal axis 64 that is perpendicular with the top surface 65 of the ground 12. For example, if the lower post 40 that is secured in the ground 12 is leaning such that the longitudinal axis 74 is not perpendicular to a top surface 65 of the ground 12, the post joint assembly 50 allows a user to adjust the position of the upper post 30 angularly or rotationally relative to the lower post 40 to a desired position (e.g., the longitudinal axis 64 is perpendicular to the top surface 65 of the ground 12) prior to securing the upper post 30 at a fixed position relative to the lower post 40.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A post joint assembly, comprising:
an upper cup member having a flat top wall, a tubular wall, a flange portion, and a threaded stud; the tubular wall being coupled to and between the flat top wall and the flange portion and extending from the flat top wall in a first direction, the flange portion extending outwardly from the tubular wall, the threaded stud having a top portion and a threaded portion coupled to the top portion, the top portion of the threaded stud being coupled to the flat top wall and a top surface of the top portion of the threaded stud being flush with a top surface of the flat top wall, the threaded portion of the threaded stud extending through a wall aperture of the flat top wall and outwardly from the flat top wall in the first direction;
a lower cup member having a parabolic dish portion, a tubular portion, and a beaded edge portion; the parabolic dish portion having a first hole extending therethrough, the tubular portion being coupled to and between the parabolic dish portion and the beaded edge portion; an outer surface of the parabolic dish portion being disposed against an inner surface of the flange portion of the upper cup member such that the threaded stud extends through the first hole;
a tensioner cup having a second hole extending therethrough; the threaded stud extending through the second hole; and
a nut threadably coupled to the threaded stud in an interior region defined by the tensioner cup such that the nut urges the tensioner cup against the lower cup member, and further urges the lower cup member against the upper cup member.

2. The post joint assembly of claim 1, further comprising: first and second screws that extend through first and second apertures, respectively, in the flat top wall of the upper cup member to couple the upper cup member to an upper post.

3. The post joint assembly of claim 1, further comprising: first and second screws that extend through first and second apertures, respectively, in the flange portion of the upper cup member and third and fourth apertures, respectively, in the parabolic dish portion of the lower cup member to couple the lower cup member to a lower post.

4. The post joint assembly of claim 1, further comprising: first and second screws that extend through first and second apertures, respectively, in the tubular portion of the lower cup member to couple the lower cup member to a lower post.

5. The post joint assembly of claim 1, wherein: the upper cup member, the lower cup member, and the tensioner cup are constructed of a metal or a metal-alloy.

6. The post joint assembly of claim 1, wherein: the flat top wall, the tubular wall, the flange portion of the upper cup member are integrally formed together.

7. The post joint assembly of claim 1, wherein: the parabolic dish portion, the tubular portion, and the beaded edge portion of the lower cup member are integrally formed together.

8. A method for coupling an upper post to a lower post, comprising:
providing an upper cup member having a flat top wall, a tubular wall, a flange portion, and a threaded stud; the tubular wall being coupled to and between the flat top wall and the flange portion and extending from the flat top wall in a first direction, the flange portion extending outwardly from the tubular wall, the threaded stud being coupled to the flat top wall and extending in the first direction;
providing a lower cup member having a parabolic dish portion, a tubular portion, and a beaded edge portion; the parabolic dish portion having a first hole extending therethrough, the tubular portion being coupled to and between the parabolic dish portion and the beaded edge portion;
providing a tensioner cup having a second hole extending therethrough;
providing a nut;
coupling the flat top wall of the upper cup member to the upper post utilizing first and second screws that extend through the flat top wall and into the upper post;
disposing an outer surface of the parabolic dish portion against an inner surface of the flange portion of the upper cup member such that the threaded stud extends through the first hole;
disposing the tensioner cup against an inner surface of the parabolic dish portion of the lower cup member such that the threaded stud extends through the second hole of the tensioner cup;
threadably disposing a nut on the threaded stud such that the nut urges the tensioner cup to contact the lower cup member, and further urges the lower cup member to contact the upper cup member; and
coupling the lower cup member to the lower post utilizing third and fourth screws that extend through the lower cup member and into the lower post.

9. The method of claim 8, further comprising:
moving the lower cup member to a desired position relative to the upper cup member; and
threadably disposing the nut further onto the threaded stud such that the lower cup member is held at the desired position relative to the upper cup member.

10. The method of claim 8, wherein coupling the lower cup member to the lower post comprises:
coupling the lower cup member to the lower post utilizing the third and fourth screws that extend through the flange portion of the upper cup member and through the lower cup member and into the lower post.

11. The method of claim 8, wherein coupling the lower cup member to the lower post comprises:
coupling the lower cup member to the lower post utilizing the third and fourth screws that extend through the tubular portion of the lower cup member and into the lower post.

12. The method of claim 8, wherein:
the upper cup member, the lower cup member, and the tensioner cup are constructed of a metal or a metal-alloy.

13. The method of claim 8, wherein:
the flat top wall, the tubular wall, the flange portion of the upper cup member are integrally formed together.

14. The method of claim 8, wherein:
the parabolic dish portion, the tubular portion, and the beaded edge portion of the lower cup member are integrally formed together.

15. The method of claim 8, wherein:
a longitudinal axis of the upper post is different than a longitudinal axis of the lower post.

16. The post joint assembly of claim 1, wherein:
the flat top wall being sized and shaped to receive a flat surface of an upper post thereon.

17. A post joint assembly, comprising:
an upper cup member having a flat top wall, a tubular wall, a flange portion, and a threaded stud; the tubular wall being coupled to and between the flat top wall and the flange portion and extending from the flat top wall in a first direction, the flange portion extending outwardly from the tubular wall, the threaded stud having a top portion and a threaded portion coupled to the top portion, the top portion of the threaded stud being coupled to the flat top wall, the threaded portion of the threaded stud extending through a wall aperture of the flat top wall and outwardly from the flat top wall in the first direction;
a lower cup member having a parabolic dish portion, a tubular portion, and a beaded edge portion; the parabolic dish portion having a first hole extending therethrough, the tubular portion being coupled to and between the parabolic dish portion and the beaded edge portion; an outer surface of the parabolic dish portion being disposed against an inner surface of the flange portion of the upper cup member such that the threaded stud extends through the first hole;
a tensioner cup having a second hole extending therethrough; the threaded stud extending through the second hole; and
a nut threadably coupled to the threaded stud in an interior region defined by the tensioner cup such that the nut urges the tensioner cup against the lower cup member, and further urges the lower cup member against the upper cup member.

18. The post joint assembly of claim 17, wherein:
the flat top wall being sized and shaped to receive a flat surface of an upper post thereon.

19. The post joint assembly of claim 18, wherein:
a top surface of the top portion of the threaded stud is level with a top surface of the flat top wall of the upper cup member.

* * * * *